United States Patent
Takano et al.

(10) Patent No.: US 10,777,809 B2
(45) Date of Patent: Sep. 15, 2020

(54) METHOD FOR PRODUCING NEGATIVE ELECTRODE ACTIVE MATERIAL FOR LITHIUM ION SECONDARY BATTERIES

(71) Applicants: JNC CORPORATION, Tokyo (JP); JNC PETROCHEMICAL CORPORATION, Tokyo (JP)

(72) Inventors: Yoshihito Takano, Chiba (JP); Tetsuro Kizaki, Chiba (JP); Masakazu Kondo, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 65 days.

(21) Appl. No.: 16/091,529

(22) PCT Filed: Apr. 6, 2017

(86) PCT No.: PCT/JP2017/014306
§ 371 (c)(1),
(2) Date: Dec. 28, 2018

(87) PCT Pub. No.: WO2017/175812
PCT Pub. Date: Oct. 12, 2017

(65) Prior Publication Data
US 2019/0131621 A1    May 2, 2019

(30) Foreign Application Priority Data
Apr. 8, 2016   (JP) .................................. 2016-077954

(51) Int. Cl.
*H01M 4/131*     (2010.01)
*H01M 4/36*      (2006.01)
(Continued)

(52) U.S. Cl.
CPC ........... *H01M 4/366* (2013.01); *C01B 33/113* (2013.01); *C08G 77/04* (2013.01); *C08G 77/38* (2013.01);
(Continued)

(58) Field of Classification Search
CPC ...... H01M 4/366; H01M 4/049; H01M 4/131; H01M 4/1391; H01M 4/485
(Continued)

(56) References Cited

U.S. PATENT DOCUMENTS 9,088,045 B2 * 7/2015 Park ..................... H01M 4/131
2015/0214548 A1 * 7/2015 Ohno ..................... H01M 4/58
429/231.8

FOREIGN PATENT DOCUMENTS

JP   2011096455   5/2011
WO  2014002602   1/2014

OTHER PUBLICATIONS

Goojin Jeong et al., "Multifunctional TiO2 coating for a SiO anode in Li-ion batteries", Journal of Materials Chemistry, Feb. 2012, pp. 7999-8004.
(Continued)

*Primary Examiner* — Brian K Talbot
(74) *Attorney, Agent, or Firm* — JCIPRNET (57) ABSTRACT

A method for producing a negative electrode active material for lithium ion secondary batteries containing a silicon-titanium oxide composite, which is characterized in that: the silicon-titanium oxide composite contained in the negative electrode active material for lithium ion secondary batteries is obtained by coating a silicon oxide by a titanium oxide; the silicon oxide is obtained by subjecting a polymerized silsesquioxane (PSQ), which has a structure of formula (1) and is obtained by subjecting a silicon compound to hydrolysis and a condensation polymerization reaction, to a heat
(Continued)

treatment in an inert gas atmosphere, and is represented by general formula SiOxCyHz (wherein $0.5<x<1.8$, $0\leq y<5$ and $0\leq z<0.4$); and after coating the silicon oxide with a titanium oxide, the resulting product is subjected to a heat treatment in a reducing gas atmosphere.

18 Claims, 1 Drawing Sheet

(51) Int. Cl.

| | |
|---|---|
| C01B 33/113 | (2006.01) |
| C09D 183/04 | (2006.01) |
| H01M 4/1391 | (2010.01) |
| C08K 3/20 | (2006.01) |
| C08G 77/38 | (2006.01) |
| C08K 9/06 | (2006.01) |
| H01M 4/04 | (2006.01) |
| C08G 77/04 | (2006.01) |
| C08G 77/00 | (2006.01) |
| H01M 4/485 | (2010.01) |
| H01M 4/02 | (2006.01) |

(52) U.S. Cl.
CPC .............. *C08G 77/80* (2013.01); *C08K 3/20* (2013.01); *C08K 9/06* (2013.01); *C09D 183/04* (2013.01); *H01M 4/049* (2013.01); *H01M 4/131* (2013.01); *H01M 4/1391* (2013.01); *H01M 4/485* (2013.01); *C01P 2004/03* (2013.01); *C01P 2004/82* (2013.01); *C01P 2006/40* (2013.01); *H01M 2004/027* (2013.01)

(58) Field of Classification Search
USPC .................................... 427/58, 115
See application file for complete search history.

(56) References Cited

OTHER PUBLICATIONS

"International Search Report (Form PCT/ISA/210) of PCT/JP2017/014306," dated Jul. 4, 2017, with English translation thereof, pp. 1-3.

* cited by examiner

METHOD FOR PRODUCING NEGATIVE ELECTRODE ACTIVE MATERIAL FOR LITHIUM ION SECONDARY BATTERIES

CROSS-REFERENCE TO RELATED APPLICATION

This application is a 371 application of the international PCT application serial no. PCT/JP2017/014306, filed on Apr. 6, 2017, which claims the priority benefit of Japan application no. 2016-077954, filed on Apr. 8, 2014. The entirety of each of the abovementioned patent applications is hereby incorporated by reference herein and made a part of this specification.

TECHNICAL FIELD

The present invention relates to a method for producing a negative electrode active material for a secondary battery in which, when it is used as a negative electrode active material for a lithium ion secondary battery, deterioration of a charging and discharging cycle is remarkably reduced, a capacity is high, and excellent charging and discharging characteristics are exhibited.

BACKGROUND ART

In recent years, along with the rapid development of electronic devices, communication devices, and the like, and the development of miniaturization technology, various portable devices have proliferated. Thus, in consideration of costs, reductions of sizes and weights of devices that are power supplies of these portable devices, and the development of secondary batteries having a high capacity and excellent lifespan characteristics are strongly required.

As such a small, lightweight and high capacity secondary battery, these days, the development of a rocking chair type lithium ion battery in which a lithium intercalation compound that releases lithium ions from between layers is used as a positive electrode material and a carbonaceous material that is typified by graphite that can occlude and release (intercalate) lithium ions between layers of crystal planes during charging and discharging is used as a negative electrode material has progressed, and such batteries have been put into practice and are generally used.

A nonaqueous electrolyte secondary battery in which a lithium compound is used as a negative electrode has a high voltage and a high energy density. Among these, the metal lithium was initially much studied as a negative electrode active material due to its high battery capacity. However, when the metal lithium is used as a negative electrode, since a large amount of dendritic lithium precipitates on surfaces of negative electrode lithium during charging, charging and discharging efficiency decreases, and dendritic lithium grows and short circuiting with a positive electrode easily occurs, or since it is sensitive to heat and impact due to instability of lithium itself, that is, high reactivity, there are still problems for commercialization.

Therefore, instead of the metal lithium, as a negative electrode active material, a carbon-based negative electrode that occludes and releases lithium ions is used.

A carbon-based negative electrode solves various problems of the metal lithium and greatly contributes to the spread of lithium ion batteries. However, as various portable devices are gradually reduced in size and weight and have high performance, increasing a capacity of lithium ion secondary batteries has become an important problem.

A lithium ion secondary battery using a carbon-based negative electrode has an inherently low battery capacity. For example, even in the case of graphite having the highest crystallinity as the carbon used, a theoretical capacity is about 372 mAh/g in a composition of $LiC_6$. This is only about 10% compared to a theoretical capacity of the metal lithium of 3860 mAh/g. Therefore, studies have been actively conducted in order to increase a capacity of a battery by introducing a metal such as lithium again into a negative electrode regardless of existing problems of a metal negative electrode.

As a representative material, use of a material including a metal that can be alloyed with lithium such as Si, Sn, and Al as a main component as a negative electrode active material has been studied. However, a material that can be alloyed with lithium such as Si and Sn has problems that, due to volume expansion during an alloying reaction with lithium, metal material particles are pulverized, and thus contact between metal material particles is less likely to occur, an electrically isolated active material is generated in an electrode, metal material particles are released from the electrode, an internal resistance increases, a capacity decreases, as a result, cycle performance deteriorate, and an electrolyte decomposition reaction due to an enlarged specific surface area becomes serious.

In order to solve problems occurring when such a metal material is used, studies in which two or more types of metal oxide having a relatively lower volume expansion rate than a metal are used as a material of a negative electrode active material are being conducted.

For example, Patent Literature 1 discloses that a material obtained by coating a titanium oxide to a silicon oxide with a silicon concentration gradient is used as a negative electrode active material of a lithium ion secondary battery, and a battery having a high capacity and improved cycle performance is obtained. In the detailed description, it is described that the silicon oxide coated with a titanium oxide is heated under a reducing atmosphere. However, there is no description about an effect on charging and discharging cycle performance, and a heat treatment is performed under an inert atmosphere in examples.

In addition, Patent Literature 2 proposes that a material in which surfaces of silicon oxide particles on which silicon nanoparticles are dispersed are coated with a titanium oxide is used as a negative electrode material for a secondary battery.

In addition, Non-Patent Literature 1 discloses that a material in which a silicon oxide is coated with an anatase type titanium oxide is used as a negative electrode material of a lithium ion battery.

However, although certain improvements in an initial capacity and cycle performance are observed in any known technology in which a material obtained by coating a titanium oxide to a silicon oxide-based compound is used, when charging and discharging are repeatedly performed, a reversibly available capacity gradually decreases, and cycle performance that are available for practical use are not obtained.

In addition, the productivity of a production method for obtaining a negative electrode material is low, and as a result, high costs are required for the technology.

REFERENCE LIST

Patent Literature

Patent Literature 1: U.S. Pat. No. 9,088,045 B2
Patent Literature 2: Japanese Patent Application Laid-Open No. 2011-96455

Non-Patent Literature

Non-Patent Literature 1: J. Mater. Chem., (2012) 22 7999-8004

SUMMARY OF INVENTION

Technical Problem

For a negative electrode active material of a lithium ion secondary battery, the development of a negative electrode active material which solves such problems of a negative electrode material of the related art and deterioration of a charging and discharging cycle is remarkably reduced, and has a high capacity and exhibits excellent charging and discharging characteristics, and a production method therefor with excellent productivity is still required.

An objective of the present invention is to provide a method for producing a negative electrode active material for a secondary battery with high productivity according to a request.

Solution to Problem

The inventors conducted studies in order to solve the above problems, and as a result, found a method for producing a negative electrode active material with high productivity in which, when the material is used as a negative electrode active material for a lithium ion secondary battery, the obtained secondary battery has a charging and discharging cycle of which deterioration is remarkably reduced and has a high capacity and excellent charging and discharging characteristics.

A first aspect of the present invention is a method for producing a negative electrode active material for a lithium ion secondary battery, including:

obtaining the silicon-titanium oxide composite by coating a titanium oxide to a silicon oxide, obtaining the silicon oxide by heating polysilsesquioxane (hereinafter referred to as PSQ in some cases) having a structure of the following formula (1) under a non-oxidizing atmosphere, wherein the silicon oxide is represented by a general formula $SiO_xC_yH_z$ ($0.5<x<1.8$, $0 \leq y<5$, $0 \leq z<0.4$) and the PSQ is obtained by at least one type of silicon compound that is subjected to a hydrolysis and polycondensation reaction; and performing a heat treatment under a reducing gas atmosphere after the titanium oxide is applied to the silicon oxide.

[Chem. 1]

(1)

(In the formula, $R^1$ and $R^4$ each are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —$CH_2$— is optionally substituted with —O—, —CH=CH—, a cycloalkylene group, or a cycloalkenylene group in a range in which the number of carbon atoms in the group does not exceed 45, and in the alkylene group in the substituted or unsubstituted arylalkyl group, any hydrogen atom is optionally substituted with a halogen atom, and any —$CH_2$— is optionally substituted with —O—, —CH=CH—, or a cycloalkylene group in a range in which the number of carbon atoms in the group does not exceed 45.

$R^2$, $R^3$, $R^5$ and $R^6$ are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —$CH_2$— is optionally substituted with —O—, —CH=CH—, a cycloalkylene group, a cycloalkenylene group, or —$SiR^1_2$—. in a range in which the number of carbon atoms in the group does not exceed 45, and in the alkylene group in the substituted or unsubstituted arylalkyl group, any hydrogen atom is optionally substituted with a halogen atom, and any —$CH_2$— is optionally substituted with —O—, —CH=CH—, a cycloalkylene group, a cycloalkenylene group, or —$SiR^1_2$— in a range in which the number of carbon atoms in the group does not exceed 45.

n is an integer of 1 or more).

A second aspect of the present invention is the method for producing a negative electrode active material for a lithium ion secondary battery according to the first aspect of the present invention, wherein the heat treatment under a non-oxidizing atmosphere is performed in a temperature range of 100° C. to 2,000° C.

A third aspect of the present invention is the method for producing a negative electrode active material for a lithium ion secondary battery according to the first or second aspect of the present invention, wherein the heat treatment under a reducing gas atmosphere is performed in a temperature range of 200° C. to 850° C.

A fourth aspect of the present invention is the method for producing a negative electrode active material for a lithium ion secondary battery according to any one of the first to third aspects of the present invention, wherein the reducing gas atmosphere is a hydrogen gas atmosphere or a mixed gas atmosphere of hydrogen gas and an inert gas which contains 2 volume % or more of hydrogen gas.

A fifth aspect of the present invention is the method for producing a negative electrode active material for a lithium ion secondary battery according to any one of the first to fourth aspects of the present invention, wherein the PSQ is a derivative or a mixture having one or more structures selected from among the following formulae (2), (3), and (4).

[Chem. 2]

(2)

[Chem. 3]

(3)

[Chem. 4]

(4)

(In the formulae, $R^1$ and $R^4$ are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH=CH—, a cycloalkylene group, or a cycloalkenylene in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH=CH—, or a cycloalkylene group in a range in which the number of carbon atoms in the group does not exceed 45.

$R^2$, $R^3$, $R^5$ and $R^6$ are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH=CH—, a cycloalkylene group, a cycloalkenylene group, or —SiR$^1_2$—. in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH=CH—, a cycloalkylene group, a cycloalkenylene group, or —SiR$^1_2$— in a range in which the number of carbon atoms in the group does not exceed 45. n is an integer of 1 or more).

A sixth aspect of the present invention is the method for producing a negative electrode active material for a lithium ion secondary battery according to any one of the first to fourth aspects of the present invention, wherein at least one type of the silicon compound is a silicon compound represented by the following formula (5):

$$R^{10}Si(R^7)(R^8)(R^9) \qquad (5)$$

(in the formula, $R^7$, $R^8$ and $R^9$ are independently a hydrogen atom, a halogen atom, a hydroxyl group or an alkoxy group having 1 to 4 carbon atoms, $R^{10}$ is a group selected from among a substituted or unsubstituted alkyl group having 1 to 45 carbon atoms, a substituted or unsubstituted aryl group and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH=CH—, a cycloalkylene group, or a cycloalkenylene group in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH=CH—, or a cycloalkylene group in a range in which the number of carbon atoms in the group does not exceed 45).

A seventh aspect of the present invention is the method for producing a negative electrode active material for a lithium ion secondary battery according to any one of the first to fourth aspects of the present invention, wherein at least one type of the silicon compound is a silicon compound represented by the following formula (6):

$$HSi(R)_3 \qquad (6)$$

(in the formula, R's are the same as or different from each other and are a group selected from among a halogen atom, a hydrogen atom, a substituted or unsubstituted alkoxy group having 1 to 10 carbon atoms, a substituted or unsubstituted aryloxy group having 6 to 20 carbon atoms, and a substituted or unsubstituted arylalkoxy group having 7 to 30 carbon atoms, and here, in the substituted or unsubstituted alkoxy group having 1 to 10 carbon atoms, the substituted or unsubstituted aryloxy group having 6 to 20 carbon atoms, and the substituted or unsubstituted arylalkoxy group having 7 to 30 carbon atoms, any hydrogen atom is optionally substituted with a halogen atom).

An eighth aspect of the present invention is a method for producing a negative electrode for a lithium ion secondary battery using the negative electrode active material for a lithium ion secondary battery produced by the method for producing a negative electrode active material for a lithium ion secondary battery according to any one of the first to seventh aspects of the present invention.

A ninth aspect of the present invention is a method for producing a lithium ion secondary battery using the negative electrode for a lithium ion secondary battery produced by the method for producing a negative electrode for a lithium ion secondary battery according to the eighth aspect of the present invention.

Advantageous Effects of Invention

According to the present invention, a titanium oxide is applied to a silicon oxide which is obtained by heating PSQ, which is obtained by a silicon compound that is subjected to a hydrolysis and polycondensation reaction, under a non-oxidizing atmosphere and which is represented by a general formula SiOxCyHz ($0.5<x<1.8$, $0 \leq y<5$, $0 \leq z<0.4$) and then heat-treated under a reducing gas atmosphere, and thus it is possible to provide a negative electrode active material at low cost.

In addition, a lithium ion secondary battery in which the negative electrode for a lithium ion secondary battery obtained using the negative electrode active material for a lithium ion secondary battery obtained by the production method of the present invention is used as a negative electrode has a charging and discharging cycle of which deterioration is remarkably reduced and which has a high capacity and excellent charging and discharging characteristics.

DESCRIPTION OF THE EMBODIMENTS

The present invention will be described below in detail.
<Production of Polysilsesquioxane (PSQ)>
PSQ used in the present invention is obtained by using at least one type of silicon compound that is subjected to a hydrolysis and polycondensation reaction.

Those used as a silicon compound are exemplified as follows.

For example, a silicon compound represented by the following formula (5) is used.

$$R^{10}Si(R^7)(R^8)(R^9) \quad (5)$$

(in the formula, $R^7$, $R^8$ and $R^9$ each are independently a hydrogen atom, a halogen atom, a hydroxyl group or an alkoxy group having 1 to 4 carbon atoms, and $R^{10}$ is a group selected from among a substituted or unsubstituted alkyl group having 1 to 45 carbon atoms, a substituted or unsubstituted aryl group and a substituted or unsubstituted arylalkyl group. Here, in the alkyl group having 1 to 45 carbon atoms, any hydrogen atom is optionally substituted with a halogen atom, any —CH$_2$— is optionally substituted with —O—, —CH=CH—, a cycloalkylene group, or a cycloalkenylene group in a range in which the number of carbon atoms in the group does not exceed 45. In the alkylene group in the substituted or unsubstituted arylalkyl group, any hydrogen atom is optionally substituted with a halogen atom, and any —CH$_2$— is optionally substituted with —O—, —CH=CH—, or a cycloalkylene group in a range in which the number of carbon atoms in the group does not exceed 45.)

In the present invention, specific examples of $R^7$, $R^8$ and $R^9$ include a hydrogen atom, a fluorine atom, a chlorine atom, a bromine atom, a hydroxyl group, a methoxy group, an ethoxy group, an n-propoxy group, an i-propoxy group, and the like.

As $R^{10}$, examples of an unsubstituted alkyl group having 1 to 45 carbon atoms include methyl, ethyl, propyl, 1-methylethyl, butyl, 2-methylpropyl, 1,1-dimethylethyl, pentyl, hexyl, 1,1,2-trimethylpropyl, heptyl, octyl, 2,4,4-trimethylpentyl, nonyl, decyl, undecyl, dodecyl, tetradecyl, hexadecyl, octadecyl, eicosyl, docosyl, triacontyl and the like.

As $R^{10}$, examples of a fluorinated alkyl group having 1 to 45 carbon atoms include 3,3,3-trifluoropropyl, 3,3,4,4,5,5,6,6,6-nonadecafluorohexyl, tridecafluoro-1,1,2,2-tetrahydrooctyl, heptadecafluoro-1,1,2,2-tetrahydrodecyl, perfluoro-1H, 1H, 2H, 2H-dodecyl, perfluoro-1H, 1H, 2H, 2H-tetradecyl, and the like.

As $R^{10}$, examples of an alkoxyalkyl group having 2 to 45 carbon atoms include 3-methoxypropyl, methoxyethoxyundecyl, 3-heptafluoroisopropoxypropyl, and the like.

As $R^{10}$, an example of an alkyl group having 1 to 45 carbon atoms in which one —CH$_2$— is substituted with a cycloalkylene group include cyclohexylmethyl, adamantaneethyl, cyclopentyl, cyclohexyl, 2-bicycloheptyl, cyclooctyl, and the like. The cyclohexyl group is an example in which —CH$_2$— in a methyl group is substituted with a cyclohexylene group. The cyclohexylmethyl group is an example in which —CH$_2$— at the 3 position in an ethyl group is substituted with a cyclohexylene group.

As $R^{10}$, an example of an alkenyl group having 2 to 45 carbon atoms include ethenyl, 2-propenyl, 3-butenyl, 5-hexenyl, 7-octenyl, 10-undecenyl, 21-docosenenyl, and the like. An example of an alkenyloxyalkyl group having 2 to 45 carbon atoms is an allyloxyundecyl group. An example of an alkyl group having 1 to 45 carbon atoms in which one —CH$_2$— is substituted with a cycloalkenylene group includes 2-(3-cyclohexenyl)ethyl, 5-(bicycloheptenyl)ethyl, 2-cyclopentenyl, 3-cyclohexenyl, 5-norbornen-2-yl, 4-cyclooctenyl, and the like.

Examples of a case in which $R^{10}$ is a substituted or unsubstituted aryl group include a phenyl group in which any hydrogen atom is optionally substituted with a halogen atom or an alkyl group having 1 to 10 carbon atoms, an unsubstituted naphthyl group, and the like. A preferable example of a halogen atom includes a fluorine atom, a chlorine atom and a bromine atom. In the alkyl group having 1 to 10 carbon atoms, any hydrogen atom is optionally substituted with a fluorine atom, and any —CH$_2$— is optionally substituted with —O—, —CH=CH—, or a phenylene group. That is, preferable examples of a case in which $R^{10}$ is a substituted or unsubstituted aryl group include an unsubstituted phenyl group, an unsubstituted naphthyl group, an alkylphenyl group, an alkyloxyphenyl group, an alkenylphenyl group, a phenyl group having a group in which any —CH$_2$— in an alkyl group having 1 to 10 carbon atoms is substituted with a phenylene group as a substituent, a group in which any hydrogen atom in such a group is substituted with a halogen atom, and the like.

Examples of a halogenated phenyl group include pentafluorophenyl, 4-chlorophenyl, 4-bromophenyl, and the like. Examples of an alkylphenyl group include 4-methylphenyl, 4-ethylphenyl, 4-propylphenyl, 4-butylphenyl, 4-pentylphenyl, 4-heptylphenyl, 4-octylphenyl, 4-nonylphenyl, 4-decylphenyl, 2,4-dimethylphenyl, 2,4,6-trimethylphenyl, 2,4,6-triethylphenyl, 4-(1-methylethyl)phenyl, 4-(1,1-dimethylethyl)phenyl, 4-(2-ethylhexyl)phenyl, 2,4,6-tris(1-methylethyl)phenyl, and the like. Examples of an alkyloxyphenyl group include (4-methoxy)phenyl, (4-ethoxy)phenyl, (4-propoxy)phenyl, (4-butoxy)phenyl, (4-heptyloxy)phenyl, (4-decyloxy)phenyl, (4-octadecyloxy)phenyl, 4-(1-methylethoxy)phenyl, 4-(2-methylpropoxy)phenyl, 4-(1,1-dimethylethoxy)phenyl, and the like. Examples of an alkenylphenyl group include 4-ethenylphenyl, 4-(1-methylethenyl)phenyl, 4-(3-butenyl)phenyl, and the like.

In addition, as a silicon compound used in the present invention, a silicon compound represented by the following formula (6) is suitable.

$$HSi(R)_3 \quad (6)$$

In Formula (6), preferable examples of R's, which are the same as or different from each other, include groups selected from a halogen atom, a hydrogen atom, a substituted or unsubstituted alkoxy group having 1 to 10 carbon atoms, and a substituted or unsubstituted aryloxy group having 6 to 20 carbon atoms, and here, in the substituted or unsubstituted alkoxy group having 1 to 10 carbon atoms and the substituted or unsubstituted aryloxy group having 6 to 20 carbon atoms, any hydrogen atom is optionally substituted with a halogen atom. As a specific example of R in Formula (6), the same group (with the number of carbon atoms specified in the seventh aspect of the present invention) as the example of $R^{10}$ in Formula (5) can be selected.

Specific examples of a silicon compound represented by Formula (6) include the following compounds and the like.

Examples thereof include a trihalogenated silane and dihalogenated silane such as trichlorosilane, trifluorosilane, tribromosilane, and dichlorosilane; trialkoxysilane and dialkoxysilane such as tri-n-butoxysilane, tri-t-butoxysilane, tri-n-propoxysilane, tri-i-propoxysilane, di-n-butoxyethoxysilane, triethoxysilane, trimethoxysilane, and diethoxysilane; and additionally, an aryloxysilane and aryloxyalkoxysilane such as triaryloxysilane, diaryloxysilane, and diaryloxyethoxysilane.

Among these, in consideration of a reaction, ease of availability, and production costs, a trihalogenated silane and a trialkoxysilane are preferable, and the trihalogenated silane is particularly preferable.

These silicon compounds represented by Formulae (5) and (6) may be used alone or in a mixture of two or more types thereof. In addition, other silicon compounds may be included.

In addition, the silicon compounds represented by Formulae (5) and (6) used in the present invention have high hydrolyzability and polycondensation reactivity, PSQ is easily obtained therefrom, and a composition and a structure of a silicon oxide obtained when a heat treatment is performed under a non-oxidizing atmosphere is easily controlled.

Next, PSQ used in the present invention is obtained by using the above silicon compound that is subjected to a hydrolysis and polycondensation reaction.

The hydrolysis can be caused by a known method, for example, hydrolysis is caused at room temperature or under heating in a solvent such as an alcohol or DMF, in the presence of an inorganic acid such as hydrochloric acid or an organic acid such as acetic acid, and water. Therefore, in a reaction solution after hydrolysis, a solvent, an acid, and water, and substances derived therefrom may be contained in addition to a hydrolysate of the silicon compound according to the present invention.

In addition, in a reaction solution after hydrolysis, the silicon compound used in the present invention may not be completely hydrolyzed and a part thereof may remain.

In addition, a polycondensation reaction of a hydrolysate partially occurs in addition to a hydrolysis reaction.

Here, a degree to which a polycondensation reaction occurs can be controlled according to a hydrolysis temperature, a hydrolysis time, acidity, and/or a solvent, and the like, and can be appropriately set according to, for example, a desired silicon oxide as will be described below.

In consideration of productivity and production costs, the present invention includes a method in which hydrolysis and a polycondensation reaction occur in parallel in one reaction chamber under the same conditions.

Regarding reaction conditions, a silicon compound represented by Formula (1) according to the present invention is added to an acidic aqueous solution while stirring, and a reaction is caused at a temperature of −20° C. to 50° C., preferably 0° C. to 40° C., and particularly preferably 10° C. to 30° C., for 0.5 hours to 20 hours, preferably 1 hour to 10 hours, and particularly preferably 1 hour to 5 hours.

Acidity during reaction can be appropriately adjusted. As an acid used for adjusting acidity, either an organic acid or an inorganic acid can be used.

Specifically, examples of the organic acid include formic acid, acetic acid, propionic acid, oxalic acid, and citric acid, and examples of the inorganic acid include hydrochloric acid, sulfuric acid, nitric acid, and phosphoric acid. However, hydrochloric acid is preferable because it can easily control a hydrolysis reaction and a subsequent polycondensation reaction, it is easily obtained and it easily adjusts a pH, and a treatment after the reaction becomes easier.

In addition, when a halogenated silane such as a trihalogenated silane is used as the silicon compound used in the present invention, since an acidic aqueous solution is formed in the presence of water, particularly, there is no need to separately add an acid, which is one preferable aspect of the present invention.

After the hydrolysis reaction and polycondensation reaction are completed, a liquid portion is separated and removed by filtration separation, centrifugation, or the like, and in some cases, drying is performed after washing with water or washing with an organic solvent, and PSQ having a structure of the following formula (1) is obtained.

[Chem. 5]

(1)

(In the formula, $R^1$ and $R^4$, and $R^2$, $R^3$, $R^5$ and $R^6$, and n are the same as those described above.)

In addition, as PSQ used in the present invention, in addition to the silicon compound that is obtained by causing a hydrolysis reaction and a polycondensation reaction, a derivative or mixture having one or more structures selected from among the following formulae (2), (3), and (4) can be used.

[Chem. 6]

(2)

-continued

[Chem. 7]

(3)

[Chem. 8]

(4)

(In the formula, $R^1$ and $R^4$ and $R^2$, $R^3$, $R^5$ and $R^6$, and n are the same as those described above.)

The polysilsesquioxane of Formulae (2) to (4) is obtained by a known method.

For example, examples of Formula (3) include polysilsesquioxane compounds described in PCT International Publication No. WO 2003/024870 and PCT International Publication No. WO 2004/081084.

<Production of Silicon Oxide>

A silicon oxide used in the present invention is obtained by heating PSQ according to the present invention obtained by the above method under a non-oxidizing atmosphere.

When a composition of the silicon oxide obtained in this manner is measured by elemental analysis, a silicon oxide represented by a general formula $SiO_xC_yH_z$ ($0.5<x<1.8$, $0\leq y<5$, $0\leq z<0.4$) is obtained.

When x is in a range of $0.5<x<1.8$, preferably $1.0<x<1.8$, and more preferably $1.2<x<1.7$, a silicon oxide is easily produced and a sufficient battery capacity is obtained. When y is in a range of $0\leq y<5$, and preferably $0\leq y<4$, sufficient conductivity and a high battery capacity are obtained. When z is in a range of $0\leq z<0.4$, and preferably $0\leq z<0.35$, the obtained secondary battery has an excellent charging and discharging capacity and a favorable cycle performance with an improved capacity retention ratio. In addition, more preferably, y and z have values in the above range as long as both are not 0 at the same time.

In addition, as a silicon oxide used in the present invention, a silicon oxide obtained using a hydrogenated polysilsesquioxane obtained from the silicon compound represented by Formula (6) described above, which is a silicon oxide having a ratio ($I_1/I_2$) of an intensity ($I_1$) of a peak 1 derived from Si—H bonds at 820 to 920 $cm^{-1}$ to an intensity ($I_2$) of a peak 2 derived from Si—O—Si bonds at 1,000 to 1,200 $cm^{-1}$ that is in a range of 0.01 to 0.35 in a spectrum measured by infrared spectroscopy (IR), is more preferable.

When the ratio ($I_1/I_2$) of the intensity ($I_1$) of the peak 1 to the intensity ($I_2$) of the peak 2 is in a range of 0.01 to 0.35, preferably 0.01 to 0.30, and more preferably 0.03 to 0.20, due to provision of an appropriate amount of Si—H bonds, when a battery is formed, deterioration of a charging and discharging cycle is remarkably reduced and a capacity is high and excellent charging and discharging characteristics can be exhibited.

A silicon oxide used in the present invention is obtained by heating the above PSQ according to the present invention under a non-oxidizing atmosphere.

The heat treatment needs to be performed under a non-oxidizing atmosphere.

Examples of the non-oxidizing atmosphere include an inert gas atmosphere, an atmosphere (it may be an atmosphere in which oxygen is removed to such an extent that generation of a desired silicon oxide is not inhibited) in which oxygen is removed by high vacuum, a reducing atmosphere, and an atmosphere in which such atmospheres are combined. Examples of an inert gas include nitrogen gas, argon gas, and helium gas. Such an inert gas can be used without any problem as long as it is one that is generally used and has a high purity standard. In addition, an atmosphere in which an inert gas is not used and oxygen is removed by high vacuum may be used. Examples of the reducing atmosphere include an atmosphere including a reducing gas such as hydrogen gas.

A temperature at which a heat treatment is performed under a non-oxidizing atmosphere according to the present invention is 100° C. to 2,000° C., and preferably 200° C. to 1,500° C., and more preferably 650° C. to 1,200° C.

A heat treatment time is not particularly limited, and is generally 30 minutes to 10 hours, and preferably 1 to 8 hours.

In the silicon oxide used in the present invention thus obtained, primary particles, which are spherical particle having a particle size of submicrons, are additionally aggregated to form a secondary aggregate having a particle size of several microns.

Since primary particles are reduced in size, when they are used for a battery as a negative electrode material of a lithium ion secondary battery, stress during expansion and contraction generated when charging and discharging are repeated as a secondary battery is reduced, and cycle deterioration is reduced, and there is an effect of improving cycle performance. In addition, when a complex secondary aggregation structure is provided, a binding property for a binder becomes favorable and more excellent cycle performance are exhibited.

In a silicon oxide-based negative electrode active material, when the particle size is smaller as described above, stress during expansion and contraction can be reduced. However, when particles have a nano particle size, or have a specific surface area that is larger than necessary because a nanoporous structure is included inside particles, an area in contact with an electrolytic solution is larger and an amount of a film formation reaction on negative electrode particle surfaces increases, which results in deterioration of cycle performance. In this case, it is thought that, since the silicon oxide according to the present invention has an appropriate submicron particle size and an appropriate specific surface area of 3 $m^2/g$ to 8 $m^2/g$, even after titanium oxide coating, an capacity reduction influence due to a film formation reaction with an electrolytic solution is low and excellent cycle performance is obtained.

In addition, the silicon oxide used in the present invention has a feature that a particle size distribution is very narrow. According to this narrow particle size distribution, handling properties during titanium oxide coating and during production of a negative electrode can become favorable and an electrode density can increase.

In addition, use of a silicon oxide represented by a general formula SiOxCy (0.5<x<1.8, 1<y<5) described in the patent specification of the invention (application number: WO2014-002602) previously filed by the present applicant as the silicon oxide used in the present invention is one preferable aspect of the present invention.

When the silicon oxide is measured according to elemental analysis, it contains at least silicon (Si), carbon (C) and oxygen (O) and is different from a general silicon oxide of the related art, and in a spectrum measured by an X-ray small angle scattering method which appears in a low angle area of 2θ<10° or less, scattering is observed in a range of $0.02^{-1}<q<0.2^{-1}$ and a carbon-silicon oxide nano domain structure with an inertial diameter of 1 to 3 nm is assumed.

When a scattering q is in a range of $0.02^{-1}$ to $0.2^{-1}$, a nano domain structure having a desired size can be obtained, and when it is used for a battery, sufficient cycle performance are obtained.

In addition, in a spectrum obtained by measuring a change in a structure of a carbon material due to a heat treatment of the silicon oxide according to Raman spectroscopy, scattering is observed at 1,590 $cm^{-1}$ (G band/graphite structure) and 1,325 $cm^{-1}$ (D band/amorphous carbon), a peak intensity ratio ($I_D/I_G$ ratio) between crystalline carbon and amorphous carbon is in range of 2.0 to 5.0, and formation of a graphitic carbon material as carbon is observed and a graphite carbon solid is included in the silicon oxide.

When the peak intensity ratio ($I_D/I_G$ ratio) is in a range of 2.0 to 5.0, crystalline carbon increases, a graphitic carbon material develops, no anisotropy appears in conductivity, a desired nano domain structure is obtained and favorable conductivity is obtained.

As described above, the silicon oxide is assumed to have a nano domain structure having a diameter of about 1 to 3 nm coated with carbon. When the O/Si ratio is in a range of 0.5 to 1.8, it is easy to produce an amorphous silicon oxide component by which a nano domain structure is obtained as a silicon oxide composite material and a sufficient battery capacity is obtained. When the C/Si ratio is in a range of 1 to 5, graphite appropriately develops, a balance between conductivity and a battery capacity is favorable, and sufficient conductivity and a high battery capacity are obtained.

<Production of Precursor of Silicon-Titanium Oxide Composite (Coating of Titanium Oxide to Silicon Oxide)>

A silicon-titanium oxide composite produced according to the present invention is obtained by coating titanium oxide on the silicon oxide used in the present invention obtained by the above method.

As a coating method, various methods are used.

For example, a method in which a silicon oxide is added to a suspension in which titanium oxide particles are suspended in a solvent, and filtration, drying, and a heat treatment are then performed is used. Preferably, a method in which the silicon oxide according to the present invention is suspended in an alkoxy titanium solution, and a condensation reaction is then caused, a titanium oxide coating is applied to surfaces of the silicon oxide, and filtration, drying, and a heat treatment are then performed is used.

Examples of alkoxy titanium used for titanium oxide coating include tetraalkoxy titanium, aryloxyoxyalkoxy titanium, dialkdialkoxy titanium, and the like. Tetraalkoxy titanium is preferable, and specifically, tetraoctoxy titanium, tetra-n-butoxy titanium, tetra-i-propoxy titanium, tetrakis(2-ethylhexyloxy) titanium, and the like are used.

A condensation reaction of a silicon oxide and alkoxy titanium in a suspension can be caused by a known method, for example, the reaction can be caused at room temperature or under heating in a solvent such as an alcohol or DMF, in the presence of an inorganic acid such as hydrochloric acid or an organic acid such as acetic acid and water as necessary.

Regarding reaction conditions, a reaction is caused with stirring, at a temperature of −20° C. to 50° C., preferably 0° C. to 40° C., and particularly preferably 10° C. to 30° C., and for 0.5 hours to 20 hours, preferably 1 hour to 10 hours, and particularly preferably 1 hour to 5 hours.

In addition, a use ratio of the silicon oxide and the alkoxy titanium is selected so that a proportion of titanium oxide in the final silicon-titanium oxide composite is in a coating amount range of 0.1 weight % to 10 weight %, and preferably 0.2 weight % to 8 weight %.

After the condensation reaction is completed, a liquid portion is separated and removed according to vacuum drying, filtration separation, centrifugation, or the like, and in some cases, after washing with a solvent, drying is performed and a silicon-titanium oxide composite precursor is obtained.

<Production of Silicon-Titanium Oxide Composite>

A silicon-titanium oxide composite produced according to the present invention is obtained by heating the silicon-titanium oxide composite precursor used in the present invention obtained by the above method under a reducing gas atmosphere.

The heat treatment needs to be performed under a reducing gas atmosphere.

As a reducing gas, in addition to hydrogen gas, carbon monoxide gas, ammonia gas, hydrogen sulfide gas, and the like are exemplified. However, in consideration of ease of handling, hydrogen gas is preferable. These reducing gases may be used alone or a mixture of two or more thereof can be used.

In addition, a mixed gas of nitrogen gas or an inert gas such as argon gas and a reducing gas is used. Regarding a mixing ratio, a proportion of the reducing gas may be 2 volume % or more with respect to the total mixed gas with the inert gas.

A heat treatment temperature at which deterioration of a charging and discharging cycle is remarkably reduced, a capacity is high, and excellent charging and discharging characteristics are exhibited is 200° C. to 850° C., preferably 250° C. to 850° C., and more preferably 250° C. to 800° C.

A heat treatment time is not particularly limited, and is generally 30 minutes to 10 hours, and preferably 1 to 8 hours.

Thus, a silicon-titanium oxide composite produced according to the present invention is obtained. However, as described above, regarding a coating amount of a titanium oxide, in the final silicon-titanium oxide composite, a coating amount range of the titanium oxide is 0.1 weight % to 10 weight %, and preferably 0.2 weight % to 8 weight %.

As the action of coated titanium oxide, the following three actions are conceivable. The first action is to impart conductivity to an active material. A titanium oxide itself is an insulator, but when lithium ions are inserted and electrons are injected into a conduction band, it becomes a conductor, and can improve electron conductivity on the surface of the active material during charging. The second action is to promote transfer of lithium ions at an interface between an active material and an electrolytic solution. For a charging reaction of a silicon oxide, much energy is required to cause a reaction according to a cleavage of a silicon-oxygen bond. However, an active barrier at an interface between an electrolytic solution and an activation material is reduced using a titanium oxide that can release and insert lithium ions with relatively low energy. The final action is a shape stabilizing effect. Since a titanium oxide can release and insert lithium ions without causing a change in the structure, when it is disposed on the surface, the shape is stabilized, and it is possible to reduce falling off of the active material and a decomposition reaction in an electrolytic solution due to generation of a newly formed surface.

In addition, some oxygen atoms are released from a surface layer of the titanium oxide covered according to a heat treatment under a reducing gas atmosphere, distortion occurs in a titanium oxide framework, and titanium having a low valence is generated. A titanium oxide layer in which there are such titanium atoms having a low valence has a stronger electron conductivity improvement effect during insertion of lithium ions and a more reduced activation barrier at an interface between an electrolytic solution and an active material than a titanium oxide layer having a constant valence, and has a smooth charging and discharging reaction can occur. Accordingly, it is thought that charging and discharging efficiency is further improved and cycle deterioration is reduced.

It is thought that the silicon oxide used in the present invention itself has high charging and discharging cycle stability, but the titanium oxide heated under a reducing gas atmosphere is applied thereto, the above actions are added and higher charging and discharging cycle stability is obtained.

<Negative Electrode Active Material Including Silicon-Titanium Oxide Composite>

The present invention provides a negative electrode active material for a lithium ion secondary battery including the silicon-titanium oxide composite produced according to the present invention.

For a battery, since it is essential to charge and discharge a large amount of current in order to increase a capacity, a material having a low electrical resistance of an electrode is required.

Therefore, a mode in which a carbon-based material is combined with the silicon-titanium oxide composite is an aspect of the present invention.

In order to combine a carbon-based material, a method in which a carbon-based material is combined with the silicon-titanium oxide composite according to a mechanical fusion treatment method such as mechanofusion or a vapor deposition method such as chemical vapor deposition (CVD), a method in which a carbon-based material is dispersed in the silicon-titanium oxide composite according to a mechanical mixing method using ball milling or vibration milling, or the like is used.

Here, in a method of combining a carbon-based material with the silicon-titanium oxide composite, a precursor of a carbon-based material is mixed with the silicon-titanium oxide composite and heated, and thus a carbon-based material in which the precursor of the carbon-based material is converted can be combined with the silicon-titanium oxide composite.

Examples of the carbon-based material used in the present invention preferably include a carbon-based material such as graphite, carbon black, graphene, fullerene, carbon nanotubes, carbon nanoforms, pitch type carbon fibers, polyacrylonitrile-based carbon fibers and amorphous carbon.

In addition, as the precursor of the carbon-based material used in the present invention, carbon-containing organic compounds and polymers that can be converted into a carbon-based material according to a heat treatment are exemplified.

For example, hydrocarbon gases of methane, ethylene, propylene and acetylene; sugars such as sucrose, glucose, and cellulose; glycols such as ethylene glycol, diethylene glycol, polyethylene glycol, and propylene glycol; a phenolic resin; an epoxy resin; polyvinyl chloride; polyvinyl alcohol; polypyrrole; and additionally, petroleum pitch, coal tar pitch, and acetylene black are exemplified.

Here, as a combining ratio between the silicon-titanium oxide composite and a carbon-based material, a proportion of the carbon-based material is preferably in a range of 10 weight % to 95 weight % with respect to a total amount of the silicon-titanium oxide composite and the carbon-based material.

<Negative Electrode>

The present invention also provides a method for producing a negative electrode including a negative electrode active material for a lithium ion secondary battery which contains the above silicon-titanium oxide composite produced according to the present invention.

For example, a method in which a negative electrode mixture material including a negative electrode active material formed by including the above silicon-titanium oxide composite produced according to the present invention or a silicon-titanium oxide composite combined with the carbon-based material and a binder may be formed into a certain shape, and the negative electrode mixture material is applied to a current collector such as a copper foil may be used for production. A negative electrode forming method is not particularly limited, and a known method can be used.

More specifically, a negative electrode active material including the silicon-titanium oxide composite produced according to the present invention or a silicon-titanium oxide composite combined with the carbon-based material is mixed with a binder as usual and a conductive material as necessary to prepare a negative electrode material composition, and this mixture is directly applied to a current collector such as a rod-like body, a plate-like body, a foil-like body, or a mesh-like body which is mainly made of copper, nickel, or stainless steel or a negative electrode material composition is separately cast on a support, and a negative electrode active material film separated from the support is laminated on a current collector to obtain a negative electrode plate. In addition, the negative electrode of the present invention is not limited to the forms listed above and can have forms other than the listed forms.

Any binder can be used as long as it is generally used in a secondary battery. Carboxy methyl cellulose, polyacrylic acid, alginic acid, glucomannan, amylose, sucrose, and derivatives thereof and polymers thereof, in addition to respective alkaline metal salts, a polyimide resin and a polyimide amide resin are exemplified. These binders may be used alone or a mixture thereof may be used. In addition, a component that imparts another function of improving a binding property for a current collector, improving dispersibility, or improving conductivity of a binder itself, for example, a styrene-butadiene rubber-based polymer or a styrene-isoprene rubber-based polymer, may be added and mixed.

<Lithium Ion Secondary Battery>

The present invention also provides a method for producing a lithium ion secondary battery in which a negative electrode including a negative electrode active material for a lithium ion secondary battery which contains the above silicon-titanium oxide composite produced according to the present invention is used.

For example, a lithium ion secondary battery is produced by the following method.

First, a positive electrode active material that can reversibly occlude and release Li atoms, a conductive additive, a binder and a solvent are mixed together to prepare a positive electrode active material composition. As in the negative electrode, the positive electrode active material composition is directly applied to a metal current collector and dried as usual to prepare a positive electrode plate.

The positive electrode active material composition is separately cast on a support and a film separated from the support is then laminated on a metal current collector, and thus a positive electrode can also be produced. A positive electrode forming method is not particularly limited, and a known method can be used.

As the positive electrode active material, any lithium-containing composite metal oxide that is generally used in the field of the secondary battery can be used. For example, $LiNi_mCo_nMn_{1-m-n}O_2$, and $LiMn_2O_4$ are exemplified. Specific examples of the composite oxide include $LiMn_2O_4$, $LiCoO_2$, $LiNiO_2$, and $LiFeO_2$. In addition, $V_2O_5$, TiS and MoS which are a compound that can oxidize and reduce lithium can be used.

As the conductive additive, carbon black, graphite fine particles, or the like is used. As the binder, a vinylidene fluoride/propylene hexafluoride copolymer, polyvinylidene fluoride (PVDF), polyacrylonitrile, polymethyl methacrylate, polytetrafluoroethylene, and a mixture thereof, or a styrene butadiene rubber-based polymer can be used. As the solvent, N-methylpyrrolidone, acetone, or water can be used.

In this case, contents of the positive electrode active material, the conductive additive, the binder and the solvent are set to amounts that are generally used in a lithium ion secondary battery.

Any separator interposed between a positive electrode and a negative electrode can be used as long as it is generally used in a lithium ion secondary battery. In particular, a separator which has low resistance to ion transfer of an electrolyte or has an excellent electrolytic solution impregnating ability is preferable. Specifically, a separator which is made of a substance selected from glass fibers, polyester, polyethylene, polypropylene, polytetrafluoroethylene (PTFE), and mixture thereof and has a form of nonwoven fabric or woven fabric may be used.

More specifically, in the case of a lithium ion secondary battery, a windable separator made of a material such as polyethylene or polypropylene is used, and in the case of a lithium ion polymer battery, a separator having an excellent organic electrolytic solution impregnating ability is used. However, a method of forming such a separator is not particularly limited, a known method can be used. For example, a separator can be produced by the following method.

That is, a polymer resin, a filler and a solvent are mixed together to prepare a separator composition, and the separator composition is then directly applied to an upper part of an electrode and dried to form a separator film or the separator composition is cast onto a support and dried and a separator film separated from the support is then laminated on the upper part of the electrode for formation.

The polymer resin is not particularly limited, and any material that is used in a binder of an electrode plate can be used. For example, a vinylidene fluoride/propylene hexafluoride copolymer, polyvinylidene fluoride, polyacrylonitrile, polymethyl methacrylate and a mixture thereof can be used.

As the electrolytic solution, those obtained by mixing one or two more types of electrolytes containing lithium salts such as $LiPF_6$, $LiBF_4$, $LiSb_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_pF_{2p+1}SO_2)(C_qF_{2q+1}SO_2)$ (here, p and q are a natural number), LiCl, and LiI with a solvent such as propylene carbonate, ethylene carbonate, diethyl carbonate, ethyl methyl carbonate, methyl propyl carbonate, butylene carbonate, benzonitrile, acetonitrile, tetrahydrofuran, 2-methyltetrahydrofuran, γ-butyrolactone, dioxolane, 4-methyl dioxolane, N,N-dimethylformamide, dimethylacetamide, dimethylsulfoxide, dioxane, 1,2-dimethoxyethane, sulfolane, dichloroethane, chlorobenzene, nitrobenzene, dimethyl carbonate, methyl isopropyl carbonate, ethyl propyl carbonate, dipropyl carbonate, dibutyl carbonate, diethylene glycol and diethylether or a solvent mixture thereof and performing dissolving can be used.

In addition, various other nonaqueous electrolytes and solid electrolytes can be used. For example, various ionic liquids to which lithium ions are added, a pseudo solid electrolyte in which an ionic liquid and fine powder are mixed, and a lithium ion conductive solid electrolyte can be used.

In addition, a mode in which a compound that promotes stable formation of a coating on the surface of a negative electrode active material is appropriately included in the electrolytic solution in order to improve charging and discharging cycle performance is an aspect of the present invention. For example, vinylene carbonate (VC), fluorobenzene, and a fluorinated carbonate such as cyclic fluorinated carbonate [fluoroethylene carbonate (FEC), trifluoropropylene carbonate (TFPC), or the like], or chain fluorinated carbonate [trifluoromethyl carbonate (TFDMC), trifluorodiethyl carbonate (TFDEC), trifluoroethylmethyl carbonate (TFEMC), or the like] are effective. Fluoroethylene carbonate (FEC) is particularly preferable.

When FEC is added, FEC is reduced and decomposed on a negative electrode during initial charging and a decomposition product such as LiF and $Li_2CO_3$ is formed. These decomposition-forming components are polymerized on the surface of a negative electrode active material and stabilized to form an excellent coating. This coating is stably present under a harsh charging and discharging environment, and is thought to have a role of promoting movement of lithium ions, and preventing a decomposition reaction of an electrolytic solution.

Here, the cyclic fluorinated carbonate and the chain fluorinated carbonate can be used as a solvent like ethylene carbonate.

A separator is disposed between a positive electrode plate and a negative electrode plate described above to form a battery structure. Such a battery structure is wound or folded and put into a cylindrical battery case or a rectangular battery case, and an electrolytic solution is then injected, and thereby a lithium ion secondary battery is completed.

In addition, after the battery structure is laminated in a bicell structure, this is impregnated into an organic electrolytic solution, and the obtained product is put into a pouch and sealed, and thereby a lithium ion polymer battery is completed.

EXAMPLES

While the present invention will be described below in more detail with reference to examples, comparative examples and a reference example, the present invention is not limited to these examples.

In this example, various analyses and evaluations were performed on silicon oxides and silicon-titanium oxide composites prepared in examples, comparative examples and a reference example.

A measuring device and a measuring method used in "elemental analysis" and "evaluation of battery characteristics" in examples, comparative examples and a reference example are as follows.

(Elemental Analysis)

Elemental composition analysis was performed by a RBS (Rutherford backward scattering analysis)/HFS (hydrogen forward scattering analysis) method in which a sample powder was solidified into a pellet form, He ions accelerated at 2.3 MeV were then emitted to the sample, an energy spectrum of backscattering particles and an energy spectrum of forward scattered hydrogen atoms were analyzed and thus a composition value having a high accuracy including hydrogen was obtained. Contents of silicon, oxygen, and titanium were measured according to RBS spectrum analysis, and a hydrogen content was measured according to analysis using RBS and HFS spectrums. In addition, a content of titanium oxide was converted by multiplying a titanium content ($TiO_2/Ti=79.87/47.87=1.67$) by 1.67 assuming that all of the titanium was formed into titanium dioxide.

The measuring device was measured by Pelletron 3SDH (commercially available from National Electrostatics Corporation) under conditions of incident ion: 2.3 MeV He, angle of incidence during RBS/HFS simultaneous measurement: 75 deg., scattering angle: 160 deg., sample current: 4 nA, and beam diameter: 2 mmφ.

(Analysis of Titanium Oxide Coating Layer)

Analysis of a titanium oxide coating layer was performed using X-ray photoelectron spectrometer PHI Quantera SXM [ULVAC-PHI] according to an X-ray source with monochromated AlKα, an output of 15 kV/25 W, and a beam diameter of 100 μmφ, and a bonding state was determined from peak positions and peak shapes of Ti2p and O1s.

(Evaluation of Battery Characteristics)

Charging and discharging characteristics of a lithium ion secondary battery or the like using a negative electrode active material which contained the silicon-titanium oxide composite produced according to the present invention were measured as follows.

Using BTS2005W (commercially available from Nagano Co., Ltd.), constant current charging was performed on a Li electrode at a current of 100 mA per 1 g (weight) of a silicon-titanium oxide composite until 0.001 V reached, and next constant voltage charging was performed until a current had a current value of 20 mA or less per 1 g of an active material while a voltage of 0.001 V was maintained.

A cell on which charging was completed was subjected to constant current discharging until a voltage reached 1.5 V at a current of 100 mA per 1 g of an active material after an idle period for about 30 minutes was elapsed.

In addition, a charging capacity was calculated from a cumulative current value until constant voltage charging was completed, and a discharging capacity was calculated from a cumulative current value until a battery voltage reached 1.5 V. During switching of charging and discharging, an open circuit was rested for 30 minutes.

Charging and discharging cycle performance were evaluated under the same conditions.

Here, a charging and discharging efficiency was a ratio of a discharging capacity to an initial (the first cycle of charging and discharging) charging capacity, and a capacity retention ratio was a ratio of a discharging capacity at the $100^{th}$ cycle of charging and discharging with respect to an initial discharging capacity.

Production of Polysilsesquioxane (PSQ)

Synthesis Example 1

360 ml of toluene (Wako Pure Chemical Corporation), 42.2 g (37% TBAH in MeOH) of tetrabutylammonium hydroxide (Tokyo Chemical Industry), and 16.2 g of pure water were put into a 1000 ml four-necked flask and the mixture was stirred and cooled in an ice bath. 360 ml of diethylether (Wako Pure Chemical Corporation), and 118.8 g of phenyltrimethoxysilane (Tokyo Chemical Industry) were put into a 500 ml dropping funnel and the mixture was added dropwise over 5 minutes. After the dropwise addition, the ice bath was removed and stirring was performed at room temperature for 70 hours. After 70 hours, filtration was performed by a pressure filtration machine.

The obtained powder was transferred into a beaker, washing with toluene was performed, and pressurized filtration was performed again. After filtration, vacuum drying was performed by a vacuum dryer at 120° C. for 6 hours, and 48.8 g of octaphenylsilsesquioxane as PSQ was obtained.

Synthesis Example 2

Synthesis of $(PhSiO_{3/2})_n$ 99.1 g of phenyltrimethoxysilane (Tokyo Chemical Industry Co., Ltd.), and 16 g of methanol (Wako Pure Chemical Corporation) were put into a 500 ml four-necked flask. While the mixture was stirred at room temperature, 36 g of 1 N HCl was slowly added dropwise into a dropping funnel over 30 minutes. After the dropwise addition was completed, heating and stirring were performed at 60° C. for 2 hours. After 2 hours, cooling was performed and 200 g of toluene (Wako Pure Chemical Corporation) was added dropwise.

Then, the reaction solution was transferred into a 500 ml separating funnel. After washing with saturated saline, washing with saturated sodium bicarbonate water was performed, and washing with saturated saline was then performed twice, and finally, washing with pure water was performed twice. After washing with water, dehydration was performed using magnesium sulfate (Wako Pure Chemical Corporation). This solution was transferred into a separable flask, a solvent was distilled off, heating was performed under a reduced pressure, and 56.1 g of $(PhSiO_{3/2})_n$ (here, n is an integer of 1 or more) as PSQ was obtained.

Synthesis Example 3

Synthesis of $(MeSiO_{3/2})_{4n}(PhSiO_{3/2})_n$ 1.3 L of an acetic acid aqueous solution in which 2 mg of acetic acid was diluted with pure water was put into a 3 L four-necked separable flask, and a mixed solution of 119 g of phenyltrimethoxysilane (Tokyo Chemical Industry Co., Ltd.), and 326 g of methyltrimethoxysilane (Tokyo Chemical Industry Co., Ltd.) was slowly added dropwise over 30 minutes with stirring. In addition, after stirring for 2 hours, 50 g of 0.4 wt % ammonia water was put into the flask and polycondensation occurred. After being left for 15 hours, a reactant was filtered using a membrane filter (pore size of 0.45 μm, hydrophilic) and a solid was collected. The obtained solid was vacuum-dried at 80° C. for 10 hours and 244 g of $(MeSiO_{3/2})_{4n}(PhSiO_{3/2})_n$ (here, n is an integer of 1 or more) as PSQ was obtained.

Synthesis Example 4

After 96 g of pure water was put into a 300 ml three-necked flask, the inside of the flask was substituted with nitrogen. Subsequently, 16.0 g (118 mmol) of trichlorosilane was added dropwise at 20° C. with stirring while the flask was cooled with ice. After the dropwise addition was completed, a hydrolysis reaction and a condensation reaction occurred at 20° C. for 2 hours with stirring.

After a reaction time was elapsed, a reactant was filtered using a membrane filter (pore size of 0.45 μm, hydrophilic), and a solid was collected. The obtained solid was vacuum-dried at 80° C. for 10 hours, and 6.03 g of a hydrogen polysilsesquioxane as PSQ was obtained.

Synthesis Example 5

12.2 g (120 mmol) of hydrochloric acid with a concentration of 36 weight % and 1.19 kg of pure water were put into a 3 l separable flask and 167 g (1.37 mol) of trimethoxysilane (Tokyo Chemical Industry Co., Ltd.) at 25° C. was added dropwise with stirring. After the dropwise addition was completed, a hydrolysis reaction and a condensation reaction occurred at 25° C. for 2 hours with stirring.

After a reaction time was elapsed, a reactant was filtered using a membrane filter (pore size of 0.45 m, hydrophilic), and a solid was collected. The obtained solid was vacuum-dried at 80° C. for 10 hours, and 76.0 g of a hydrogen polysilsesquioxane as PSQ was obtained.

Example 1

<Production of Silicon Oxide>

15.0 g of octaphenylsilsesquioxane obtained in Synthesis Example 1 was put into an SSA-S grade alumina boat, and the boat was then set in a vacuum purge type tube furnace KTF43N1-VPS (commercially available from Koyo Thermo Systems Co., Ltd.), and as heat treatment conditions, under an argon gas atmosphere (high purity argon of 99.999%), while argon gas was supplied at a flow rate of 200 ml/min, heating was performed at a rate of 4° C./min, burning was performed at 1,200° C. for 1 hour, and thus a silicon oxide was obtained. Next, using a zirconia ball mill, the obtained silicon oxide was milled in the atmosphere for about 3 hours, and additionally, classified using a 32 μm stainless steel sieve, and thus a powdered granular silicon oxide having a maximum particle size of 32 μm was obtained.

Elemental analysis results of the obtained silicon oxide are shown in Table 1.

<Production of Silicon-Titanium Oxide Composite Precursor (Coating of Titanium Oxide to Silicon Oxide)>

In the same manner as above, 18.9 g of the obtained silicon oxide was put into a 300 ml eggplant type flask into which 95 ml of ethanol (Wako Pure Chemical Corporation: special grade reagent) was put, and a dispersion treatment was performed for 3 minutes using an ultrasonic cleaning bath and for 5 minutes using a magnetic stirrer. After the dispersion treatment, with stirring, 3.64 g of tetraisopropoxytitanium (Alfa Aesar 95% reagent) was added dropwise, and stirring was continued at room temperature for 1.5 hours. After 1.5 hours, stirring was stopped and a solvent was concentrated using an evaporator. When the solvent was volatilized, the flask was transferred into a vacuum dryer, heating and vacuum drying were performed for 1 hour at 60° C., and a silicon-titanium oxide composite precursor powder was collected.

<Production of Silicon-Titanium Oxide Composite>

In the same manner as in the above adjustment of the silicon oxide, the collected silicon-titanium oxide composite precursor powder was set in a vacuum purge type tube furnace KTF43N1-VPS, and as heat treatment conditions, under an argon-hydrogen mixed gas (hydrogen gas concentration: 10 volume %) atmosphere, while an argon-hydrogen mixed gas was supplied at a flow rate of 250 ml/min, heating was performed at a rate of 4° C./min, and burning was performed at 400° C. for 1 hour. Next, grinding was performed using a mortar and classification was performed using a stainless steel sieve, and 19.3 g of a powdered granular silicon-titanium oxide composite having a maximum particle size of 32 μm was obtained.

Analysis results of contents of coated titanium oxide of the silicon-titanium oxide composite are shown in Table 1.

<Preparation of Negative Electrode>

3.2 g of the silicon-titanium oxide composite and 0.4 g of acetylene black were added to 20 g of an aqueous solution containing 2 weight % of carboxymethyl cellulose, the mixture was mixed for 15 minutes using a stirrer in the flask, distilled water was then added thereto so that a solid content concentration became 15 weight %, and additionally the mixture was stirred for 15 minutes to prepare a slurry composition. This slurry composition was transferred into a thin-film spin system high-speed mixer (Filmix 40-40 type, commercially available from Primix Corporation), and stirred and dispersed at a rotational speed of 20 m/s for 30 seconds. The slung after the dispersion treatment was coated at a thickness of 200 μm onto a copper foil roller according to a doctor blade method.

After the coating, air drying was performed for 30 minutes. Then, drying was performed on a hot plate at 80° C. for 90 minutes. After the drying, a negative electrode sheet was pressed using a 2t small precision roll press (commercially available from Thank Metal). After the pressing, an electrode was punched using an electrode punching punch HSNG-EP (φ 14.50 mm), and vacuum drying was performed in a glass tube oven GTO-200 (SIBATA) at 80° C. for 12 hours or longer to prepare a negative electrode.

<Preparation and Evaluation of Lithium Ion Secondary Battery>

Figure 1:
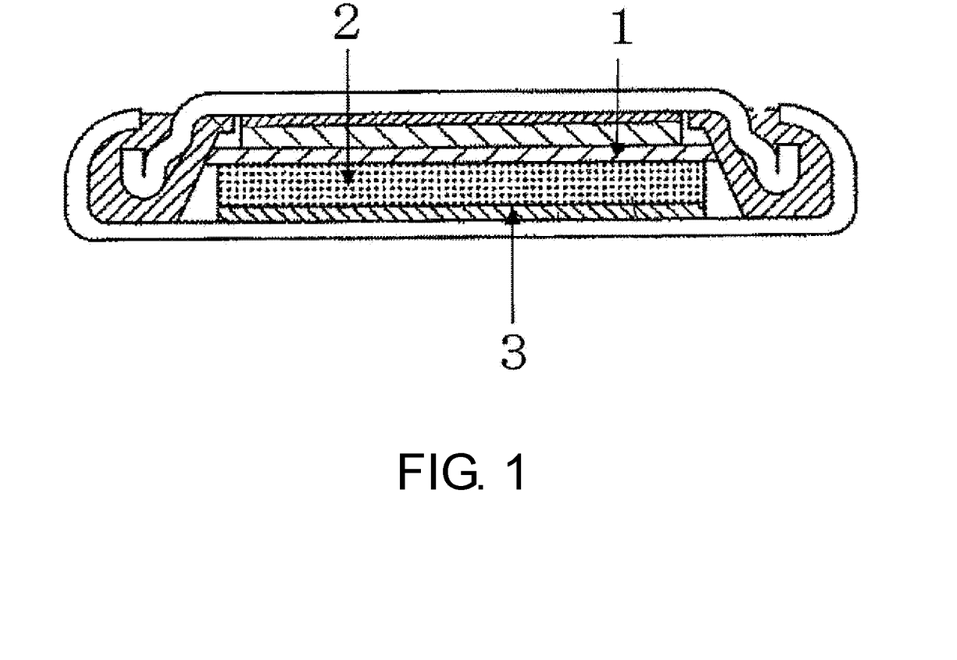
FIG. 1 is a diagram showing a configuration example of a coin type lithium ion secondary battery.

A 2032 type coin battery having a structure shown in FIG. 1 was prepared. A metal lithium was used as a positive electrode 3, a microporous polypropylene film was used as a separator 2, and the negative electrode body was used as a negative electrode 1. As an electrolytic solution, a solution in which 5 weight % of fluoroethylene carbonate (FEC) was added to a solvent mixture containing ethylene carbonate and diethyl carbonate at a volume ratio of 1:1 in which $LiPF_6$ was dissolved at a rate of 1 mol/L was used.

Next, battery characteristics of the lithium ion secondary battery were evaluated. The results are shown in Table 1 and Table 2.

Example 2

A silicon-titanium oxide composite was obtained in the same manner as in Example 1 except that, when a silicon oxide was produced, $(PhSiO_{3/2})_n$ obtained in Synthesis Example 2 was used in place of octaphenylsilsesquioxane, a burning temperature under an argon gas atmosphere was set to 1,000° C., and when a silicon-titanium oxide composite was produced, a burning temperature under an argon-hydrogen mixed gas was set to 600° C.

Elemental analysis results of the silicon oxide and evaluation results of battery characteristics when the silicon-titanium oxide composite was used as a negative electrode material are shown in Table 1 and Table 2.

Example 3

A silicon-titanium oxide composite was obtained in the same manner as in Example 1 except that, when a silicon oxide was produced, $(MeSiO_{3/2})_{4n}(PhSiO_{3/2})_n$ (here, n is an integer of 1 or more) obtained in Synthesis Example 3 was used in place of octaphenylsilsesquioxane, and a burning time under an argon gas atmosphere was set to 5 hours, and when a silicon-titanium oxide composite was produced, a concentration of hydrogen in an argon-hydrogen mixed gas was set to 4 volume %, and a burning temperature under the mixed gas was set to 200° C.

Elemental analysis results of the silicon oxide and evaluation results of battery characteristics when the silicon-titanium oxide composite was used as a negative electrode material are shown in Table 1 and Table 2.

Example 4

<Production of Silicon Oxide>

18.9 g of a silicon oxide was obtained in the same manner as in Example 1 except that, when a silicon oxide was produced, 20.0 g of a hydrogen polysilsesquioxane synthesized in Synthesis Example 4 was used as PSQ, and a burning temperature under an argon gas atmosphere was set to 900° C. Elemental analysis results of the obtained silicon oxide are shown in Table 1.

<Titanium Oxide Coating Treatment>

Figure 2:
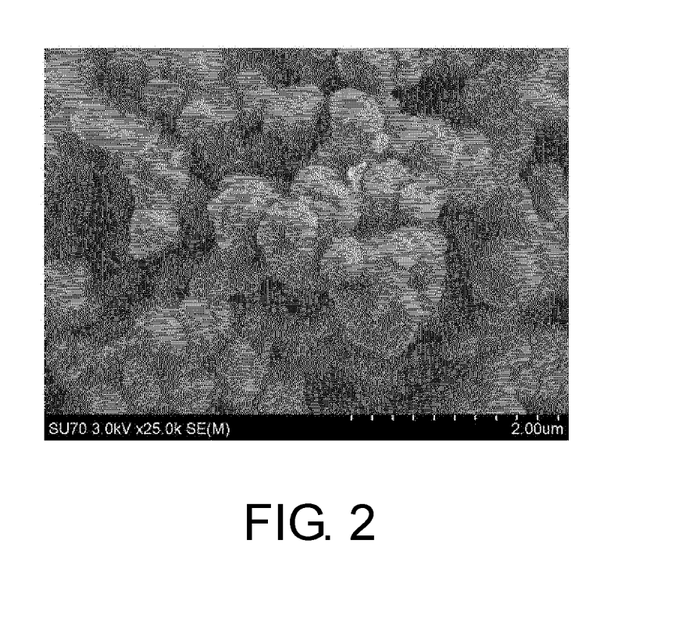
FIG. 2 is a microscope (SEM) picture of a silicon-titanium oxide composite produced in Example 4.

A silicon-titanium oxide composite was obtained in the same manner as in Example 1 except that the silicon oxide produced according to the above method was used. As is apparent from the scanning electron microscope (SEM) picture shown in FIG. 2, the silicon-titanium oxide composite was formed when primary particles as spherical particles having a submicron particle size were additionally aggregated to form a secondary aggregate having a particle size of several microns.

<Preparation of Negative Electrode>

3.2 g of the silicon-titanium oxide composite and 0.4 g of acetylene black were added to 30 g of an aqueous solution containing 1.5 weight % of sodium alginate, the mixture was mixed for 15 minutes using a stirrer in the flask, distilled water was then added thereto so that solid content concentration became 13 weight %, and additionally the mixture was stirred for 15 minutes to prepare a slurry composition. This slurry composition was transferred into a thin-film spin system high-speed mixer (Filmix 40-40 type, commercially available from Primix Corporation), and stirred and dispersed at a rotational speed of 20 m/s for 30 seconds. The slurry after the dispersion treatment was applied at a thickness of 200 µm onto a copper foil roller according to a doctor blade method.

After the application, drying was performed on a hot plate at 80° C. for 90 minutes. After the drying, a negative electrode sheet was pressed using a 2t small precision roll press (commercially available from Thank Metal). After the pressing, an electrode was punched using an electrode punching punch HSNG-EP (q 14.50 mm), and vacuum drying was performed in a glass tube oven GTO-200 (SIBATA) at 80° C. for 16 hours to prepare a negative electrode.

(Preparation and Evaluation of Lithium Ion Secondary Battery)

A lithium ion secondary battery was prepared in the same manner as in Example 1 except the above negative electrode body was used as a negative electrode 1, and battery characteristics were evaluated.

The results are shown in Table 2.

Example 5

A silicon oxide was obtained in the same manner as in Example 4 except that, when a silicon oxide was produced, a hydrogen polysilsesquioxane synthesized in Synthesis Example 5 was used as PSQ, and a burning temperature under an argon gas atmosphere was set to 1,000° C. Subsequently, a silicon-titanium oxide composite was obtained in the same manner as in Example 4 except that, although the same procedure as in Example 4 was performed, an amount of tetraisopropoxytitanium dropped was reduced by half, and a titanium oxide coating treatment was performed, and a concentration of hydrogen in an argon-hydrogen mixed gas was set to 4 volume %.

For the silicon-titanium oxide composite, a negative electrode body was prepared in the same manner as in Example 1, and battery characteristics of the lithium ion secondary battery were evaluated.

The results are shown in Table 2.

Comparative Example 1

A silicon oxide was obtained in the same manner as in Example 4 except that a commercially available silicon monoxide (under 325 mesh commercially available from Sigma-Aldrich Co. LLC) in place of PSQ was classified using a 32 µm stainless steel sieve, a silicon monoxide powder having a maximum particle size of 32 µm was used, and a burning temperature was set to 900° C.

A silicon-titanium oxide composite was obtained in the same manner as in Example 4 except that the silicon oxide was used.

For the silicon-titanium oxide composite, a negative electrode body was prepared in the same manner as in Example 4, and battery characteristics of the lithium ion secondary battery were evaluated.

Comparative Example 2

A silicon-titanium oxide composite was obtained in the same manner as in Comparative Example 1 except that a heat treatment was performed using only argon gas without mixing hydrogen in place of an argon-hydrogen mixed gas in Comparative Example 1.

For the silicon-titanium oxide composite, a negative electrode body was prepared in the same manner as in Example 4, and battery characteristics of the lithium ion secondary battery were evaluated.

Reference Example 1

A silicon-titanium oxide composite was obtained in the same manner as in Example 1 except that a heat treatment temperature when a silicon-titanium oxide composite was produced in Example 1 was set to 200° C., and a heat treatment was performed using only argon gas without mixing hydrogen in place of an argon-hydrogen mixed gas.

For the silicon-titanium oxide composite, a negative electrode body was prepared in the same manner as in Example 1, and battery characteristics of the lithium ion secondary battery were evaluated.

Elemental analysis results of the silicon oxides of Examples 1 to 5, Comparative Examples 1 and 2, and Reference Example 1 of the present invention and evaluation results of the battery characteristics when the negative electrodes prepared using the negative electrode active materials were used are shown Table 1 and Table 2.

TABLE 1

|  | Silicon oxide | | | | | | Silicon-titanium oxide composite | | |
|---|---|---|---|---|---|---|---|---|---|
|  | Burning | | Elemental analysis | | | | Heat treatment | | |
|  | Temperature | Time | (molar ratio) | | | | $H_2$ volume | Temperature | Amount of $TiO_2$ |
|  | ° C. | hr | Si | O | C | H | % | ° C. | Wt % |
| Example 1 | 1,200 | 1 | 1.0 | 1.50 | 3.85 | 0.01 | 10 | 400 | 5 |
| Example 2 | 1,000 | 1 | 1.0 | 1.65 | 3.68 | 0.04 | 10 | 600 | 5 |
| Example 3 | 1,200 | 5 | 1.0 | 1.48 | 1.33 | 0.02 | 4 | 200 | 2 |
| Example 4 | 900 | 1 | 1.0 | 1.52 | 0 | 0.03 | 10 | 400 | 5 |
| Example 5 | 1,000 | 1 | 1.0 | 1.5 | 0 | 0.01 | 4 | 400 | 2 |
| Comparative Example 1 | 900 | 1 | 1.0 | 1.03 | 0 | 0.03 | 10 | 400 | 5 |
| Comparative Example 2 | 900 | 1 | 1.0 | 1.05 | 0 | 0.04 | 0 | 400 | 5 |
| Reference Example 1 | 1,200 | 1 | 1.0 | 1.41 | 3.70 | 0.01 | 0 | 200 | 5 |

TABLE 2

|  | Battery characteristics | | | | |
|---|---|---|---|---|---|
|  | Initial charging mAh/g | Initial discharging mAh/g | $100^{th}$ discharging mAh/g | Efficiency % | Retention ratio % |
| Example 1 | 1,005 | 624 | 562 | 62.1 | 90.1 |
| Example 2 | 1,122 | 693 | 622 | 61.8 | 89.7 |
| Example 3 | 1,406 | 889 | 805 | 63.2 | 90.6 |
| Example 4 | 1,942 | 1,260 | 1,220 | 64.9 | 96.8 |
| Example 5 | 1,958 | 1,294 | 1,249 | 66.1 | 96.5 |
| Comparative Example 1 | 2,084 | 1,486 | 428 | 71.3 | 28.8 |
| Comparative Example 2 | 2,150 | 1,521 | 380 | 70.7 | 25.0 |
| Reference Example 1 | 1,032 | 598 | 507 | 57.9 | 84.8 |

According to the above results, the negative electrode active material obtained by performing a titanium oxide coating treatment under a reducing gas atmosphere on the silicon oxide produced from PSQ used in the present invention had a higher initial capacity and discharging capacity at the $100^{th}$ cycle than a carbon-based negative electrode active material of the related art. In addition, a reduction in the capacity was small, and favorable cycle performance in which a capacity retention ratio was high, that is, deterioration of a charging and discharging cycle was remarkably reduced were obtained. The negative electrode active material, negative electrode, and lithium ion secondary battery produced according to the method of the present invention were evaluated so that they are available for practical use.

INDUSTRIAL APPLICABILITY

When the negative electrode is formed using a negative electrode active material for a lithium ion secondary battery obtained by the method of the present invention and is used for a lithium ion secondary battery, it is possible to obtain a lithium ion secondary battery having an excellent capacity and excellent charging and discharging characteristics and cycle performance. For example, the present invention is a technology beneficial in the field of batteries, and particularly, in the field of secondary batteries.

What is claimed is:

1. A method for producing a negative electrode active material for a lithium ion secondary battery including a silicon-titanium oxide composite, comprising:
    obtaining the silicon-titanium oxide composite by coating a titanium oxide to a silicon oxide;
    obtaining the silicon oxide by heating polysilsesquioxane (hereinafter referred to as PSQ) having a structure of the following formula (1) under a non-oxidizing atmosphere, wherein the silicon oxide is represented by a general formula SiOxCyHz ($0.5<x<1.8$, $0 \leq y<5$, $0<z<0.4$) and the PSQ is obtained by at least one type of silicon compound that is subjected to a hydrolysis and polycondensation reaction; and
    performing a heat treatment under a reducing gas atmosphere after the titanium oxide is applied to the silicon oxide, (1)

(in the formula, $R^1$ and $R^4$ each are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH=CH—, a cycloalkylene group, or a cycloalkenylene group in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH=CH—, or a cycloalkylene group in a range in which the number of carbon atoms in the group does not exceed 45;

$R^2$, $R^3$, $R^5$ and $R^6$ are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH=CH—, a cycloalkylene group, a cycloalkenylene group, or —SiR$^1{}_2$— in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH=CH—, a cycloalkylene group, a cycloalkenylene group, or —SiR$^1{}_2$— in a range in which the number of carbon atoms in the group does not exceed 45, and n is an integer of 1 or more).

2. The method for producing a negative electrode active material for a lithium ion secondary battery according to claim 1,
wherein the heat treatment under the non-oxidizing atmosphere is performed in a temperature range of 100° C. to 2,000° C.

3. The method for producing a negative electrode active material for a lithium ion secondary battery according to claim 1,
wherein the heat treatment under the reducing gas atmosphere is performed in a temperature range of 200° C. to 850° C.

4. The method for producing a negative electrode active material for a lithium ion secondary battery according to claim 1,
wherein the reducing gas atmosphere is a hydrogen gas atmosphere or a mixed gas atmosphere of hydrogen gas and an inert gas which contains 2 volume % or more of hydrogen gas.

5. The method for producing a negative electrode active material for a lithium ion secondary battery according to claim 1,
wherein the PSQ is a derivative or a mixture having one or more structures selected from among the following formulae (2), (3), and (4):

(2)

(3)

(4)

(in the formulae, $R^1$ and $R^4$ are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH=CH—, a cycloalkylene group, or a cycloalkenylene in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH=CH—, or a cycloalkylene group in a range in which the number of carbon atoms in the group does not exceed 45;

$R^2$, $R^3$, $R^5$ and $R^6$ are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH=CH—, a cycloalkylene group, a cycloalkenylene group, or —SiR$^1{}_2$— in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH=CH—, a cycloalkylene group, a cycloalkenylene group, or —SiR$^1{}_2$— in a range in which the number of carbon atoms in the group does not exceed 45, and n is an integer of 1 or more).

6. The method for producing a negative electrode active material for a lithium ion secondary battery according to claim 1,
wherein at least one type of the silicon compound is a silicon compound represented by the following formula (5):

$$R^{10}Si(R^7)(R^8)(R^9) \quad (5)$$

(in the formula, $R^7$, $R^8$ and $R^9$ are independently a hydrogen atom, a halogen atom, a hydroxyl group or an alkoxy group having 1 to 4 carbon atoms, $R^{10}$ is a group selected from among a substituted or unsubstituted alkyl group having 1 to 45 carbon atoms, a substituted or unsubstituted aryl group and a substituted or unsubstituted arylalkyl group, and here, in the alkyl group having 1 to 45 carbon atoms, any hydrogen atom is optionally substituted with a halogen atom, any —$CH_2$— is optionally substituted with —O—, —CH=CH—, a cycloalkylene group, or a cycloalkenylene group in a range in which the number of carbon atoms in the group does not exceed 45, and in the alkylene group in the substituted or unsubstituted arylalkyl group, any hydrogen atom is optionally substituted with a halogen atom, and any —$CH_2$— is optionally substituted with —O—, —CH=CH—, or a cycloalkylene group in a range in which the number of carbon atoms in the group does not exceed 45).

7. The method for producing a negative electrode active material for a lithium ion secondary battery according to claim 1,
wherein at least one type of the silicon compound is a silicon compound represented by the following formula (6):

$$HSi(R)_3 \quad (6)$$

(in the formula, R's are the same as or different from each other and are a group selected from among a halogen atom, a hydrogen atom, a substituted or unsubstituted alkoxy group having 1 to 10 carbon atoms, a substituted or unsubstituted aryloxy group having 6 to 20 carbon atoms, and a substituted or unsubstituted arylalkoxy group having 7 to 30 carbon atoms, and here, in the substituted or unsubstituted alkoxy group having 1 to 10 carbon atoms, the substituted or unsubstituted aryloxy group having 6 to 20 carbon atoms, and the substituted or unsubstituted arylalkoxy group having 7 to 30 carbon atoms, any hydrogen atom is optionally substituted with a halogen atom).

8. A method for producing a negative electrode for a lithium ion secondary battery using the negative electrode active material for a lithium ion secondary battery produced by the method for producing a negative electrode active material for a lithium ion secondary battery according to claim 1.

9. A method for producing a lithium ion secondary battery using the negative electrode for a lithium ion secondary battery produced by the method for producing a negative electrode for a lithium ion secondary battery according to claim 8.

10. The method for producing a negative electrode active material for a lithium ion secondary battery according to claim 2,
wherein the heat treatment under the reducing gas atmosphere is performed in a temperature range of 200° C. to 850° C.

11. The method for producing a negative electrode active material for a lithium ion secondary battery according to claim 2,
wherein the reducing gas atmosphere is a hydrogen gas atmosphere or a mixed gas atmosphere of hydrogen gas and an inert gas which contains 2 volume % or more of hydrogen gas.

12. The method for producing a negative electrode active material for a lithium ion secondary battery according to claim 3,
wherein the reducing gas atmosphere is a hydrogen gas atmosphere or a mixed gas atmosphere of hydrogen gas and an inert gas which contains 2 volume % or more of hydrogen gas.

13. The method for producing a negative electrode active material for a lithium ion secondary battery according to claim 2,
wherein the PSQ is a derivative or a mixture having one or more structures selected from among the following formulae (2), (3), and (4):

(in the formulae, $R^1$ and $R^4$ are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —$CH_2$— is optionally substituted with —O—, —CH=CH—, a cycloalkylene group, or a cycloalkenylene in a range in which the number of carbon atoms in the group does not exceed 45, and in the alkylene group in the substituted or unsubstituted arylalkyl group, any hydrogen atom is optionally substituted with a halogen atom, and any —$CH_2$— is optionally substituted with —O—, —CH=CH—, or a cycloalkylene group in a range in which the number of carbon atoms in the group does not exceed 45;

$R^2$, $R^3$, $R^5$ and $R^6$ are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH=CH—, a cycloalkylene group, a cycloalkenylene group, or —SiR$^1{}_2$— in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH=CH—, a cycloalkylene group, a cycloalkenylene group, or —SiR$^1{}_2$— in a range in which the number of carbon atoms in the group does not exceed 45, and n is an integer of 1 or more).

14. The method for producing a negative electrode active material for a lithium ion secondary battery according to claim 3, wherein the PSQ is a derivative or a mixture having one or more structures selected from among the following formulae (2), (3), and (4):

(in the formulae, R$^1$ and R$^4$ are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH=CH—, a cycloalkylene group, or a cycloalkenylene in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH=CH—, or a cycloalkylene group in a range in which the number of carbon atoms in the group does not exceed 45;

R$^2$, R$^3$, R$^5$ and R$^6$ are independently a group selected from among a hydrogen atom, a substituted or unsubstituted alkyl group having 1 to 45 carbon atoms, a substituted or unsubstituted aryl group, and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH=CH—, a cycloalkylene group, a cycloalkenylene group, or —SiR$^1{}_2$— in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH=CH—, a cycloalkylene group, a cycloalkenylene group, or —SiR$^1{}_2$— in a range in which the number of carbon atoms in the group does not exceed 45, and n is an integer of 1 or more).

15. The method for producing a negative electrode active material for a lithium ion secondary battery according to claim 2, wherein at least one type of the silicon compound is a silicon compound represented by the following formula (5):

$$R^{10}Si(R^7)(R^8)(R^9) \qquad (5)$$

(in the formula, R$^7$, R$^8$ and R$^9$ are independently a hydrogen atom, a halogen atom, a hydroxyl group or an alkoxy group having 1 to 4 carbon atoms, R$^{10}$ is a group selected from among a substituted or unsubstituted alkyl group having 1 to 45 carbon atoms, a substituted or unsubstituted aryl group and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH=CH—, a cycloalkylene group, or a cycloalkenylene group in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH=CH—, or a cycloalkylene group in a range in which the number of carbon atoms in the group does not exceed 45).

16. The method for producing a negative electrode active material for a lithium ion secondary battery according to claim 3, wherein at least one type of the silicon compound is a silicon compound represented by the following formula (5):

$$R^{10}Si(R^7)(R^8)(R^9) \qquad (5)$$

(in the formula, R$^7$, R$^8$ and R$^9$ are independently a hydrogen atom, a halogen atom, a hydroxyl group or an alkoxy group having 1 to 4 carbon atoms, R$^{10}$ is a group selected from among a substituted or unsubstituted alkyl group having 1 to 45 carbon atoms, a substituted or unsubstituted aryl group and a substituted or unsubstituted arylalkyl group, and here, in the alkyl group having 1 to 45 carbon atoms, any hydrogen atom is optionally substituted with a halogen atom, any —CH$_2$— is optionally substituted with —O—, —CH═CH—, a cycloalkylene group, or a cycloalkenylene group in a range in which the number of carbon atoms in the group does not exceed 45, and in the alkylene group in the substituted or unsubstituted arylalkyl group, any hydrogen atom is optionally substituted with a halogen atom, and any —CH$_2$— is optionally substituted with —O—, —CH═CH—, or a cycloalkylene group in a range in which the number of carbon atoms in the group does not exceed 45).

17. The method for producing a negative electrode active material for a lithium ion secondary battery according to claim 2,
wherein at least one type of the silicon compound is a silicon compound represented by the following formula (6):

HSi(R)$_3$                      (6)

(in the formula, R's are the same as or different from each other and are a group selected from among a halogen atom, a hydrogen atom, a substituted or unsubstituted alkoxy group having 1 to 10 carbon atoms, a substituted or unsubstituted aryloxy group having 6 to 20 carbon atoms, and a substituted or unsubstituted arylalkoxy group having 7 to 30 carbon atoms, and here, in the substituted or unsubstituted alkoxy group having 1 to 10 carbon atoms, the substituted or unsubstituted aryloxy group having 6 to 20 carbon atoms, and the substituted or unsubstituted arylalkoxy group having 7 to 30 carbon atoms, any hydrogen atom is optionally substituted with a halogen atom).

18. The method for producing a negative electrode active material for a lithium ion secondary battery according to claim 3,
wherein at least one type of the silicon compound is a silicon compound represented by the following formula (6):

HSi(R)$_3$                      (6)

(in the formula, R's are the same as or different from each other and are a group selected from among a halogen atom, a hydrogen atom, a substituted or unsubstituted alkoxy group having 1 to 10 carbon atoms, a substituted or unsubstituted aryloxy group having 6 to 20 carbon atoms, and a substituted or unsubstituted arylalkoxy group having 7 to 30 carbon atoms, and here, in the substituted or unsubstituted alkoxy group having 1 to 10 carbon atoms, the substituted or unsubstituted aryloxy group having 6 to 20 carbon atoms, and the substituted or unsubstituted arylalkoxy group having 7 to 30 carbon atoms, any hydrogen atom is optionally substituted with a halogen atom).

\* \* \* \* \*